United States Patent Office 3,445,405
Patented May 20, 1969

3,445,405
FLAME-RESISTANT POLYURETHANE COMPOSITIONS
Herwart C. Vogt, Grosse Ile, Mich., assignor to Wyandotte Chemicals Corporation, Wyandotte, Mich., a corporation of Michigan
No Drawing. Filed June 1, 1965, Ser. No. 460,569
Int. Cl. C08g 22/04, 51/00; C09h 3/28
U.S. Cl. 260—2.5   9 Claims

ABSTRACT OF THE DISCLOSURE

A polyurethane is prepared from the reaction of a polyisocyanate and a polyether polyol with the condensation product of tris(hydroxymethyl) phosphine oxide and an alkylene oxide.

---

This invention relates to polyurethanes and more particularly is directed to a new and improved fire-retardant polyurethane copolymers and methods for preparing them.

Polyurethane resin masses are well known in the plastic art. The rigid cellular or foamed resins derived from organic polyisocyanates are expanding in application, particularly in the field of insulating materials. Such polymers due largely to their thermal insulating character find increasing application in the construction of refrigerators, truck panels, acoustical tile, airplane parts and in the building field. In many of these important areas, it is required that the insulating material be fire-retardant.

It is known to impart fire-retardant properties by addition to the copolymerizable mass of adjuvants such as organic phosphorus compounds, for example tris(2-chloroethyl)phosphate, dialkyl phenyl phosphonate, and inorganic compounds such as ammonium phosphate, and antimony oxides. These materials, of course, vary in their efficacy and generally the effect obtained is directly proportional to the amount used. These agents do not react with the polymer and not only is the effect induced fugitive, but also their presence in the resin mass leads to a deterioration of physical properties of the copolymer, such as dimensional stability, compression strength, density and the like. Fire-retardant polyurethanes have also been prepared by using halogenated polyesters as a component of the copolymer. However, these structures are difficult to handle and are relatively expensive. Thus, while fire-retardant polyurethane resin masses are generally known in the art, these compositions leave much to be desired.

Accordingly, it is an object of this invention to provide polyurethane resin masses characterized by a high degree of fire-retardancy, good dimensional stability, low density and high compression strength.

Another object is to provide a process for producing fire-resistant polyurethane foams.

Another object is to provide economical and commercially feasible methods of obtaining fire-retardant rigid and flexible polyurethane resin masses having improved properties.

These and other objects of the present invention will be obvious to those skilled in the art from the following description.

The present invention resides in the discovery that the use of condensation products of at least one alkylene oxide and tris(hydroxymethyl)phosphine oxide (hereinafter sometimes referred to as THPO) in the reaction involving a polyisocyanate and a polyether polyol makes it possible to produce polyurethanes having improved properties. Since the condensation products are polyethers and do not contain ester linkages, they are not subject to hydrolysis with the same ease as the phosphorus esters previously employed. Moreover, they are, in general, readily compatible with the non-phosphorus-containing organic polyhydroxy compounds conventionally employed in the production of polyurethane materials, a fact which renders them superior to the conventional materials.

Broadly speaking, the present invention relates to an improved fire-resistant polyurethane which is prepared by mixing and reacting (1) a polyisocyanate, (2) a polyether polyol, and (3) a condensation product of one mole of tris(hydroxymethyl)phosphine oxide with from about 2 to about 12 moles of an alkylene oxide. The amounts of the reactants employed in preparing the product can vary over relatively wide ranges. It is usually preferred to use from about 20 to about 50 parts by weight of the polyisocyanate, from about 15 to about 40 parts by weight of the polyether polyol, and about 15 to about 40 parts by weight of the condensation product, based on a total of 100 parts by weight of the reaction ingredients. In a preferred embodiment, the polyurethane material is produced in the form of a foam by the use of a controlled amount of water or a blowing agent, preferably a fluorinated aliphatic saturated hydrocarbon. When preparing foamed products, a catalyst and a nucleating agent in addition to the blowing agent are usually included in the reaction mixture. The amounts of these materials used can vary considerably, but they are generally in the approximate ranges of 0.1 to 2.5 parts by weight for the catalyst, 4 to 20 parts by weight for the blowing agent, and 0.3 to 2.0 parts by weight for the nucleating agent. It is to be understood that the reaction mixture contains a total of 100 parts by weight of the various ingredients. The cellular product obtained by reacting these materials has a majority of closed cells filled by gas generated by the blowing agent. The porduct is fire-retardant and has good dimensional stability and high compression strength.

The polyurethane materials of this invention may be prepared by what is commonly called in the art the "one-shot" process or by the well known "prepolymer" method. In the "one-shot" method of manufacture, usually used in making foamed-in-place articles, the reactants are mixed together all at once or simultaneously and the resultant mixture immediately injected or poured into a mold or form. In the "prepolymer" method of manufacturing polyurethane resins, the polyisocyanate, in stoichiometric excess, is first reacted with an active hydrogen-containing, high molecular weight organic compound having at least two active hydrogens whereby a "prepolymer" is formed. The "prepolymer" and the tris(hydroxymethyl)phosphine oxide alkylene oxide condensation product, along with other appropriate ingredients, are then mixed together and reacted to form the desired product.

The condensation products for use in the invention may be prepared by reacting THPO with an alkylene oxide, preferably from about 2 to 12 moles of the alkylene oxide per mole of THPO. If desired, a mixture of alkylene oxides may be used and these may be condensed with the THPO concurrently to produce a random copolymeric condensation product. The alkyene oxide is usually an aliphatic 1,2-alkylene oxide, for example, ethylene oxide, propylene oxide, butylene oxide, or an epihalohydrin.

Propylene and butylene oxide tris(hydroxymethyl) phosphine oxide condensation products are preferred over the ethylene oxide condensation product. Polyurethane foams made from propylene and butylene oxide tris(hydroxymethyl)phosphine oxide condensation products hydrolyze less than foams made from the THPO ethylene oxide condensation products. Hydrolysis of foams breaks the chains, thus increasing the sol fraction of the urethane. As the length of the chains becomes shorter, the properties of the foam begin to fall off.

Epichlorohydrin tris(hydroxymethyl)phosphine oxide condensation products produce foams exhibiting excellent flame-resistant properties. Both phosphorus and chlorine are known to give a measure of flame resistance to certain chemical compounds. The combination of both phosphorus and chlorine into the condensation product improves the self-extinguishing characteristics of the foams made therefrom.

It was found that the phosphine oxide condensation products were more desirable than the phosphate condensation products. This is believed to be due to the phosphorus-carbon linkage stability of the phosphine oxide condensation products as compared to the phosphorus-oxygen linkage in the phosphate condensation products.

It was observed that polyurethane foams from tris(hydroxymethyl)phosphine oxide condensed with up to about 12 moles of an alkylene oxide exhibit fire-resistant properties. When more than about 12 moles of an alkylene oxide are used, the fire-resistant properties of foams based on tris(hydroxymethyl)phosphine oxide diminish. This is believed to be the result of the shielding or blocking effect of the relatively large number of alkylene oxide groups attached to the phosphorus atom.

The phosphorus-containing polyethers may be reacted with a variety of diisocyanates in such amounts as to provide a substantial excess of diisocyanate molecules as compared with the available hydroxyls. Diisocyanates which may be interacted with polyethers in accordance with the provisions of the present invention contain the group $$O=C=N-R-N=C=O$$

where R is aromatic, heterocyclic, aliphatic or a mixed group comprising moieties from two or more of these classes. Preferably, it contains from about 2 to 19 carbon atoms. The hydrocarbon group may also contain chlorine or other substantially nonfunctioning groups. Illustrative examples of diisocyanates which may be employed in the practice of the invention include diphenyl diisocyanate, triphenyl diisocyanate, chlorophenyl-2,4-diisocyanate, ethylene diisocyanate, 1,4-tetramethylene diisocyanate, p-phenylene diisocyanate (preferably as a mixture of 2,4 and 2,6 isomers), p′-diisocyanate diphenylmethane, hexamethylene diisocyanate, and the like. Preferred polyisocyanates which may be used are polymethylene polyphenylisocyanate, triphenylmethane triisocyanate and tolylene diisocyanate. The p-tolylene diisocyanate or mixed isomers containing the same because of general availability and satisfactory operation, in the process, are presently preferred.

Prepolymers of the polyisocyanates with various polyether polyols are suitable and in most instances are to be preferred. Prepolymers as is well known, are formed by condensing active hydrogen-containing high molecular weight substances, such as glycols, with a polyisocyanate, with one or the other of the components in excess. Subsequently, the prepolymer is caused to react with the balance of the component not used in excess so that the resulting co-polymer is substantially completely free of reactive groups. In the present instance, it is preferred to use a prepolymer containing an excess of isocyanate groups.

The isocyanate-terminated polyurethane prepolymers employed as starting materials according to the present invention, may be any such type compound having a molecular weight in excess of about 500 which may be obtained by the reaction of a polymeric polyether polyol having an average molecular weight of at least 250, with the stoichiometric excess of an organic polyisocyanate. Such prepolymers are capable of a molecular weight increase through chain extension with a particular chain extension agents.

The polyurethane polymers which may be extended according to this invention, include those which are prepared from polyalkylene ether polyols and diisocyanates. The term polyalkylene ether polyol as used herein refers to polyalkylene ethers which contain terminal hydroxy groups.

The following discussion relates in greater detail to the reactants and their characteristics, as well as further additional particulars of the invention.

The polyoxyalkylene addition product of a polyhydric alcohol preferably contains from 2 to 6 hydroxyl groups, inclusive, and has a molecular weight between about 270 and 1200. This reactant may be, for example, polyoxyethylene, polyoxypropylene, polyoxyethylenepolyoxypropylene, polyoxybutylene, or like derivatives of trimethylolpropane, glycerine, hexanetriol, pentaerythritol, sorbitol, dimethylolphenols, triisopropanolamine, tetra(2-hydroxypropyl)ethylene diamine, and the like, so long as the required molecular weights are met. Polyoxypropylene glycols of the requisite characteristics may also be used. These products are in general prepared by the addition of alkylene oxides having from 2 to 4 carbon atoms to the starting glycol or polyol. When different types of alkyleneoxy groups are to be present, these products are made by addition of varying alkylene oxides sequentially to the starting glycol or polyol. Polyols, as opposed to glycols, are preferred, as are the derivatives of polyhydric alkanols.

Representative of this reactant are the following:

|  | M.W. |
|---|---|
| Polyoxyethylene derivative of pentaerythritol | 360 |
| Polyoxypropylene derivative of pentaerythritol | 400 |
| Polyoxypropylene derivative of pentaerythritol | 600 |
| Polyoxypropylene derivative of pentaerythritol | 1,000 |
| Polyoxyethylene derivative of trimethylolpropane | 270 |
| Polyoxypropylene derivative of trimethylolpropane | 400 |
| Polyoxypropylene derivative of trimethylolpropane | 750 |
| Polyoxypropylene derivative of dimethylolphenol | 400 |
| Polyoxypropylene derivative of glycerol | 400 |
| Polyoxypropylene derivative of glycerol | 750 |
| Polyoxypropylene derivative of hexanetriol | 400 |
| Polyoxypropylene derivative of hexanetriol | 750 |
| Polyoxypropylene derivative of sorbitol | 750 |
| Polyoxyethylene polyoxypropylene derivative of tetra-(2-hydroxypropyl)ethylene diamine | 600 |
| Polyoxyethylene polyoxypropylene derivative of tetra-(2-hydroxypropyl)ethylene diamine | 900 |
| Polyoxypropylene derivative of tetra-(2-hydroxypropyl)ethylene diamine | 600 |
| Polyoxypropylene derivative of triisopropanolamine | 425 |
| Polyoxypropylene derivative of triisopropanol amine | 750 |
| Polyoxypropylene derivative of propylene glycol | 400 |
| Polyoxypropylene derivative of propylene glycol | 300 |
| Polyoxyethylene polyoxypropylene derivative of propylene glycol | 400 |
| Polyoxybutylene derivative of propylene glycol | 450 | and numerous other polyoxyalkylene derivatives of polyhydric alcohols having from 2 to 6 hydroxyl groups, inclusive, and the prescribed molecular weight. A preferred polymeric polyol is an addition product of propylene oxide and trimethylolpropane having an approximate molecular weight of 400 to 450, averaging about 418 and having an average hydroxyl number of 409.

Tetra-(hydroxyalkyl)alkylene diamines having a moleular weight between about 220 and 400 may be used. This reactant may be, for example, alkylene oxide addition products of ethylene, propylene, butylene, amylene and like diamines, for example the ethylene oxide, propylene oxide or butylene oxide addition products thereof, or compounds in which part of the alkylene oxide addition is with one of the named alkylene oxides and the rest with another of the named alkylene oxides. Any of the compounds produced by these variations may be used provided the molecular weight requirement is met.

Representative compounds are:

|  | M.W. |
|---|---|
| Tetra-(hydroxyethyl)ethylene diamine | 236 |
| Tetra-(hydroxyethyl)propylene diamine | 250 |
| Tetra-(hydroxyethyl)butylene diamine | 264 |
| Tetra-(hydroxyethyl)amylene diamine | 278 |
| Tetra-(2-hydroxypropyl)ethylene diamine | 292 |
| Tetra-(2-hydroxypropyl)propylene diamine | 306 |
| Tetra-(2-hydroxypropyl)butylene diamine | 320 |
| Tetra-(3-hydroxypropyl)ethylene diamine | 292 |
| Tetra-(3-hydroxypropyl)propylene diamine | 306 |
| Tetra-(3-hydroxypropyl)butylene diamine | 320 |
| Tetra-(4-hydroxybutyl)ethylene diamine | 348 |
| Tetra-(3-hydroxybutyl)propylene diamine | 362 |
| Tetra-(4-hydroxybutyl)butylene diamine | 376 |
| Tri(hydroxyethyl)mono(2 - hydroxypropyl)ethylene diamine | 250 |
| Di(hydroxyethyl)di(2 - hydroxypropyl)ethylene diamine | 264 |
| Mono(hydroxyethyl)tri(2 - hydroxypropyl)ethylene diamine | 278 | with N,N,N',N' - tetrakis(2 - hydroxypropyl)ethylene diamine being preferred, and numerous other tetra-(hydroxyalkyl)alkylene diamines having the prescribed characteristics.

POLYURETHANE PREPOLYMER—PREPARATION

In the preparation of the starting polyurethane polymer, an excess of organic polyisocyanate over the polymeric polyol is used, which may be only a slight excess of the stoichiometric amount. In the case of a diisocyanate and a dihydridic polyalkylene ether, the ratio of NCO to OH of the polyol must be at least 1 to 1, and may be up to about 3 to 1, equivalent ratio. The polyol and the isocyanate are ordinarily reacted by heating with agitation at a temperature of 50° C. to 130° C., preferably 70° C. to 120° C. The ratio of the organic polyisocyanate compound to polymeric polyol is usually and preferably between and about 1.3 to 1 and 2.0 to 1.

The reaction is preferably, but not necessarily, effected in the absence of a solvent, when the prepolymer is a fluid at processing temperatures. When it is not or when it is desired to employ a solvent, convenient solvents are organic solvents having a boiling range above about 90° C. when the reaction is to be carried out in open equipment. Lower boiling solvents may of course be used where the reaction is carried out in closed equipment to prevent boiling of the solvent at temperatures of the reaction. Solvents boiling at substantially more than 140° C. are difficult to remove from the final chain extended product at desirable working temperatures, although it will be obvious that higher boiling solvents may be employed where the excess solvent is removed by means other than by heating or distillation. The solvent, when used, may be added at the beginning, at the intermediate point, or at the end of the prepolymer reaction stage, or after cooling of the formed prepolymer. The solvents to be used are preferably those in which the reactants have some solubility but in which the chain extended polyurethane is insoluble. Ketones, tertiary alcohols and esters may be used. The aliphatic hydrocarbon solvents such as the heptanes, octanes, and nonanes, or mixtures of such hydrocarbons obtained from naturally occurring petroleum sources such as kerosene, or from synthetically prepared hydrocarbons, may also be employed. Cycloaliphatic hydrocarbons, such as methylcyclohexane, and aromatic hydrocarbons, such as toluene, may likewise be used. Toluene and isopropylacetate are preferred solvents. The amount of solvent used may be varied widely. From about 25 to 400 parts of solvent per 100 parts of polyol have been found to be operable.

The excess solvent, where large amounts are employed, may be separated partially or completely from the polymer prior to emulsification in the water solution, if an emulsion technique is to be employed in the chain extension; sometimes the excess solvent is useful and is allowed to remain in the emulsification stage.

The reactants are cooked for a period sufficient to react most, if not all, of the hydroxy groups whereafter the prepolymer is allowed to stand and the free NCO content determined.

Usual pH's are employed during preparation of the prepolymer, the reaction preferably being maintained substantially neutral. Bases accelerate the reaction, acids retard the reaction, and preferably neither are added.

PREPARATION OF TRIS(HYDROXYMETHYL) PHOSPHINE OXIDE

One thousand grams (5.25 moles) of tetrakis(hydroxymethyl)phosphonium chloride were dissolved in water to yield an aqueous solution containing about 40% of the phosphonium chloride (ca. 1500 ml.). To this solution were added 675 grams (5.35 moles) sodium sulfite while agitating the resulting mixture. The pH of the solution was adjusted to about eleven by adding 27.4 grams of a 50% aqueous solution of sodium hydroxide. The mixture was then slowly heated to 75° C. for about 2 hours. The reaction mixture was agitated during the entire reaction period as gases were evolved. After completion of the reaction, 28 ml. of concentrated hydrochloric acid was admixed with the reaction product, whereby the pH was adjusted to about five. The acidified mass was then distilled under vacuum until substantially free of water. During distillation, the ultimate pot temperature was 95° C. and the pressure about 20 mm. Hg. The resulting viscous melt weighed 1842 grams. Two procedures were devised to isolate the desired product, tris(hydroxymethyl)phosphine oxide.

(a) A continuous extraction apparatus was developed which allowed the use of isopropanol. The continuous extraction of the salt cake was run for better than one week. As soon as a layer of the product collected in the receiving flask, it was filtered to remove any entrained salts and evaporated to dryness by means of an aspirator and a pump. A yield of 591 grams (80.5%) was realized using this technique.

(b) After acidification and stripping of the water from the reaction product, the salt cake was extracted with approximately three liters of anhydrous methanol. This allowed very rapid isolation of the THPO (eight hours compared to the previous one week). After the alcohol had been stripped, the product was filtered through a sintered glass funnel to remove any residual salts. A quantitative yield was realized.

PREPARATION OF TRIS(HYDROXYMETHYL) PHOSPHINE OXIDE+TWO MOLES PROPYLENE OXIDE ADDUCTS (1) In a two liter round bottom flask equipped with a stirrer, dropping funnel, thermometer, and a Dry-Ice condenser, 140 grams (1.0 mole) tris(hydroxymethyl)phosphine oxide was dissolved in 500 ml. water containing two grams sodium hydroxide (two grams per mole of polyol) as catalyst. The temperature was maintained at 70° C. as the propylene oxide was added dropwise. After approximately 100 ml. of oxide was added, the temperature dropped to 46° C. due to the excess propylene oxide. The excess oxide was stripped and the reaction temperature increased to 80° C. Another 15 ml. propylene oxide was added, total uptake being 115 ml. or 1.7 moles. The reaction mixture was acidified with glacial acetic acid and the water stripped off under diminished pressure. The product was filtered to remove any residual salts.

(2) The reaction was repeated using identical conditions except two grams (two grams per mole of polyol)

potassium hydroxide as catalyst. Again, approximately two moles of propylene oxide reacted.

PREPARATION OF TRIS(HYDROXYMETHYL) PHOSPHINE OXIDE+THREE EQUIVALENCE PROPYLENE OXIDE (THPO+3PO)

Charge:                                                          Grams
    THPO (7.0 moles) _____ 980
    N-methyl morpholine (0.1 mole) _____   10
    Water (distilled) (2.8 moles) _____   50
    Propylene oxide (22.3 moles) _____ 1295

A one gallon autoclave was cleaned, dried and charged with the above tris(hydroxymethyl)phosphine oxide, amine and water. The reactor was sealed and heated to 100° C. at which temperature the propylene oxide feed was initiated. The oxide was added in eight hours at a pressure of 12 to 9 p.s.i.g. After the addition was completed, the reaction mixture was stirred and heated at 100° C. for 45 minutes. The reaction was cooled to 30° C. and blown. The crude product was stripped at 100 to 125° C./2 mm. Hg for three hours. The yield of stripped product was 1850 grams having the following properties:

Hydroxyl number _____ 510
Molecular weight, theo. _____ 314
pH (2½% aqueous) _____ 5.7
Acid number _____ 6.1

PREPARATION OF TRIS(HYDROXYMETHYL) PHOSPHINE OXIDE+THREE MOLES PROPYLENE OXIDE FROM THE SODIUM SALT (PA–634)

In a two liter round bottom flask equipped with a thermometer, stirrer, dropping funnel and distilling head with condenser, 140 grams (1.0 mole) tris(hydroxymethyl)phosphine oxide was dissolved in 400 ml. anhydrous methanol. To this solution, 162 grams (3.0 moles) sodium methoxide was added incrementally. The reaction went through an exotherm, allowing some of the methanol to be distilled. One liter of toluene as diluent was added and the methanol was stripped under diminished pressure. The yellow-white slurry was heated to 60° C. by means of a hot water bath and the propylene oxide added dropwise. Uptake of oxide was rapid and smooth. Reaction was cooled to room temperature and acidified with glacial acetic acid. The diluent was stripped, but the high concentration and solubility of the sodium acetate did not allow the isolation of the product by filtration. The tacky salt cake was extracted with 1500 ml. hot isopropanol. The alcohol was stripped under diminished pressure, and afforded the desired product.

Example 1

(a) A prepolymer was made in accordance with the procedure set out above. A 3 to 1 mole ratio of tolylene diisocyanate (80%, 2,4; 20%, 2,6) to polyol were mixed and heated to about 100° C. for about three hours. The polyol was a 400 molecular weight triol based on trimethylolpropane capped with propylene oxide and represented by the formula

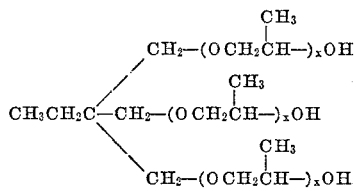

wherein $x$ is an integer such that the molecular weight of the polyol was about 400.

(b) The urethane foams used to test the flame retardance were prepared by the usual procedure. Thus, 17.8 grams of the prepolymer as prepared in part (a) and 0.2 gram of Silicone L–520 were mixed as component I. Component II was made by mixing 5.6 grams THPO, 1.0 gram Freon 11, 0.6 gram DBTAc and 0.01 gram DABCO. Freon 11 is trichlorofluoromethane. Silicone L–520 is a polyoxyalkylene-polydimethyl siloxane block copolymer and serves as a nucleating agent for bubble formation. DBTAc is dibutyltin diacetate and is a polyurethane initiator. DABCO, also a polyurethane initiator, is diaza-bicyclo (2.2.2) octane (triethylene diamine).

The two components (I and II) were rapidly stirred together for approximately fifteen to thirty seconds and poured into an open mold and allowed to rise. The samples were conditioned overnight at room temperature followed by six days in a constant temperature room (75° F. and 50% relative humidity) before physical properties were measured.

(c) The foam produced above contained about 5.3% phosphorus and was self-extinguishing. Self-extinguishing materials are those which continue to burn after removal of the flame but discontinue burning of their own accord before the specimen is consumed. Non-burning materials, as used herein, are defined as materials which burn for less than five seconds after removal of the flame before they extinguish themselves.

Example 2

(a) A prepolymer was prepared as in Example 1(a).

(b) As component I, 5.0 grams of the prepolymer was mixed with 0.2 gram of Silicone L–520. Component II consisted of 1.0 gram Freon 11, 5.0 grams of THPO+two moles propylene oxide condensation product and 0.01 gram DABCO. The two components (I and II) were mixed, allowed to rise and conditioned as in Example 1.

(c) The foam produced was self-extinguished and contained 6.0 percent phosphorus.

Example 3

(a) A prepolymer was prepared as in Example 1(a).

(b) As component I, 100 grams of the prepolymer were mixed with 0.5 gram Silicone L–520 nucleating agent. Component II resulted from a mixture of 21.0 grams of Freon 11, 50.7 grams of the condensation product of THPO and two moles of propylene oxide, and 1.5 grams tin octoate catalyst. Components I and II were mixed, allowed to rise and conditioned as in the above examples.

(c) The foam produced had 4.1% phosphorus.

Example 4

(a) A prepolymer was prepared as in Example 1(a).

(b) As component I, 100 grams of the prepolymer were mixed with 0.5 gram Silicone L–520 nucleating agent. Component II resulted from a mixture of 21.0 grams of Freon 11, 50.7 grams of the condensation product of THPO and two moles of propylene oxide, and 0.5 gram tin octoate catalyst. Components I and II were mixed, allowed to rise and conditioned as in the above examples.

(c) The foam produced had 4.1% phosphorus.

Example 5

(a) A prepolymer was prepared as in Example 1(a).

(b) As component I, 100 grams of the prepolymer were mixed with 0.5 gram Silicone L–520 nucleating agent. Component II resulted from a mixture of 21.0 grams of Freon 11, and 50.7 grams of the condensation product of THPO and two moles of propylene oxide. Components I and II were mixed, allowed to rise and conditioned as in the above examples.

(c) The foam produced had 4.1% phosphorus.

Example 6

This example illustrates in a "one-shot" procedure the preparation of a flame-resistant polyurethane foam. In the "one-shot" procedure all the reactants are mixed together at once.

Eighty-five grams of trimethylolpropane capped with propylene oxide having a molecular weight of about 400 are placed in a mixing vessel. One hundred thirty-two grams of a THPO-three mole propylene oxide condensation product is added to the polyol. To this mixture about one hundred fifteen grams of tolylene diisocyanate, forty-six grams of trichlorofluoromethane, one gram of Silicone L-520, and two-tenths gram of dibutyltin diacetate are added and the mixture is stirerd rapidly for about fifteen to thirty seconds. The mixture is then poured into a form and the foam allowed to rise.

The foam will have a density of about 2.10 pounds per cubic foot, a yield strength of about 31 and will be self-extinguishing.

Examples 7–14

(a) A prepolymer was formed as in Example 1(a).

(b) Components I and II, as tabulated in Table I, were mixed, allowed to rise and conditioned as in the above examples. Table II illustrates the physical properties of the foams of Examples 7 to 14. The burning rate equals $240/t$ where $t$ is the time to burn from 1" to 4" lines, in seconds, ASTM 1692–59T.

moles of an alkylene oxide, a catalyst, a nucleating agent and a blowing agent.

5. A fire-resistant polyurethane foam produced by reacting components I and II wherein component I is a prepolymer formed by reacting a polyalkylene ether polyol and a diisocyanate containing from 2 to 19 carbon atoms and component II is a mixture of the condensation product of one mole of tris(hydroxymethyl)phosphine oxide with from 2 to 12 moles of an alkylene oxide, a blowing agent, a nucleating agent and a catalyst to produce said foam.

6. The fire-resistant polyurethane foam of claim 5 wherein said dissocyanate is a mixture of 2,4- and 2,6-tolylene diisocyanate.

7. The fire-resistant polyurethane foam of claim 5 wherein said polyalkylene ether polyol has a molecular weight from about 250 to 1000.

TABLE I

| Example No. | Component I | | Component II | | | Phosphorus, wt. percent |
|---|---|---|---|---|---|---|
| | Prepolymer, grams | Silicone L-520, grams | Freon 11, grams | THPO+3 Moles propylene oxide, grams | Catalyst, grams | |
| 7 | 200 | 1.0 | 46.0 | 132 | 2.0 DABCO | 3.9 |
| 8 | 200 | 1.0 | 46.0 | 132 | 0.2 DBTAc | 3.9 |
| 9 | 200 | 1.0 | 46.0 | 132 | 0.2 SN octoate | 3.9 |
| 10 | 200 | 1.0 | 45.0 | 114 | 0.175 DBTAc | 3.4 |
| 11 | 200 | 1.0 | 45.0 | 96 | 0.150 DBTAc | 2.9 |
| 12 | 200 | 1.0 | 44.0 | 78 | 0.125 DBTAc | 2.4 |
| 13 | 200 | 1.0 | 43.0 | 60 | 0.1 DBTAc | 1.9 |
| 14 | 200 | 1.0 | 40.0 | Control | | |

TABLE II.—PHYSICAL CHARACTERISTICS OF FOAMS OF EXAMPLES 7 TO 14

| Example No. | Density, lbs./cu. ft. | Yield strength | Percent deflection at yield point | Closed cell content, percent | Strength/density | Burning rate, $240/t$ |
|---|---|---|---|---|---|---|
| 7 | 2.15 | 28.5 | 5.3 | 86.7 | 13.3 | (¹) |
| 8 | 2.26 | 35.2 | 5.6 | 89.6 | 15.6 | (¹) |
| 9 | 2.08 | 30.8 | 6.0 | 88.8 | 14.8 | (¹) |
| 10 | 2.14 | 35.4 | 5.5 | 88.1 | 16.3 | (¹) |
| 11 | 2.05 | 34.4 | 6.1 | 84.0 | 16.8 | (¹) |
| 12 | 2.07 | 35.0 | 5.6 | 85.5 | 16.9 | 2.2 |
| 13 | 2.26 | 39.6 | 6.1 | 89.4 | 17.5 | 2.2 |
| 14 | 2.18 | 49.8 | 9.1 | 88.3 | 22.8 | 3.8 |

¹ Self-extinguishing.

It is to be understood that the invention is not to be limited to the exact details of operation or exact compounds shown and described, as obvious modifications and equivalents will be apparent to one skilled in the art, and the invention therefore is to be limited only by the scope of the appended claims.

What I claim is:

1. A polyurethane material produced by mixing and reacting an organic polyisocyanate, a polyether polyol and a condensation product of one mole of tris-(hydroxymethyl)phosphine oxide with from 2 to 12 moles of an alkylene oxide.

2. The polyurethane material of claim 1 wherein said alkylene oxide is selected from the group consisting of ethylene oxide, propylene oxide, butylene oxide and mixtures thereof.

3. A polyurethane material produced by reacting an isocyanate-terminated prepolymer with a condensation product of one mole of tris(hydroxymethyl)phosphine oxide with from 2 to 12 moles of an alkylene oxide.

4. A polyurethane flame-resistant composition formed by reacting simultaneously a polyether polyol, an organic polyisocyanate, a condensation product of one mole of tris(hydroxymethyl)phosphine oxide with from 2 to 12

8. The fire-resistant polyurethane foam of claim 5 wherein said condensation product is one mole of tris-(hydroxymethyl)phosphine oxide and two moles of propylene oxide.

9. The fire-resistant polyurethane foam of claim 5 wherein said condensation product is one mole of tris-(hydroxymethyl)phosphine oxide and three moles of propylene oxide.

References Cited

UNITED STATES PATENTS 3,242,108   3/1966   McGary et al. _____ 260—2.5
3,268,360   8/1966   Beninate et al. ____ 260—2.5 XR

FOREIGN PATENTS 1,368,775   6/1964   France.
816,069   7/1959   Great Britain.
974,033   4/1962   Great Britain.

DONALD E. CZAJA, *Primary Examiner.*

M. J. WELSH, *Assistant Examiner.*

U.S. Cl. X.R.

260—77.5